(12) United States Patent  (10) Patent No.: US 8,220,434 B2
Mouradov                    (45) Date of Patent:     Jul. 17, 2012

(54) INTERNAL-COMBUSTION ENGINE

(76) Inventor: Tamerlan Mouradov, Toronto (CA)

( * ) Notice: Subject to any disclaimer, the term of this patent is extended or adjusted under 35 U.S.C. 154(b) by 478 days.

(21) Appl. No.: 12/387,943

(22) Filed: May 11, 2009

(65) Prior Publication Data
US 2010/0282206 A1    Nov. 11, 2010

(51) Int. Cl.
F16C 7/00    (2006.01)
F02B 75/32   (2006.01)

(52) U.S. Cl. ............... 123/197.3; 123/192.1; 74/579 E; 74/595; 74/604

(58) Field of Classification Search .............. 123/192.1, 123/197.1, 197.3, 197.4; 74/579 E, 595, 74/603, 604
See application file for complete search history.

(56) References Cited

U.S. PATENT DOCUMENTS

| | | | | |
|---|---|---|---|---|
| 1,607,130 A * | 11/1926 | Knight | ............................ | 92/126 |
| 2,287,472 A * | 6/1942 | Eby | ................................. | 74/44 |
| 2,574,934 A * | 11/1951 | Perry | ................................ | 74/44 |
| 3,633,429 A * | 1/1972 | Olson | ............................... | 74/44 |
| 3,908,623 A * | 9/1975 | McWhorter | .............. | 123/197.2 |
| 4,203,406 A * | 5/1980 | Smith | ........................ | 123/197.2 |
| 4,567,866 A * | 2/1986 | Schubert | .................... | 123/197.1 |
| 4,584,972 A * | 4/1986 | Jayne et al. | ................ | 123/197.4 |
| 5,025,757 A * | 6/1991 | Larsen | ......................... | 123/48 R |
| 5,186,127 A * | 2/1993 | Cuatico | ........................ | 123/53.1 |
| 5,245,962 A * | 9/1993 | Routery | ..................... | 123/197.3 |
| 5,555,777 A * | 9/1996 | Bell | ................................ | 74/595 |
| 5,651,304 A * | 7/1997 | Allsopp | ......................... | 92/187 |
| 6,109,135 A * | 8/2000 | Karsdon | .................... | 74/579 E |
| 6,612,281 B1 * | 9/2003 | Martin | ....................... | 123/197.4 |
| 7,814,881 B2 * | 10/2010 | McRae | ...................... | 123/197.4 |

* cited by examiner

Primary Examiner — Erick Solis

(57) ABSTRACT

The Internal-Combustion Engine is set forth, in which when in use there is no lateral component of the force on the piston which is taken up by the slider rolling by the bearings. As a result of this the cylinder compression is improved, power losses on friction are reduced and wear out of the cylinder is decreased. Also due to the absence of the lateral component of the force on the piston, the latter can be made in a relieved version, e.g. without a skirt and with two compressing rings in one groove.

10 Claims, 11 Drawing Sheets

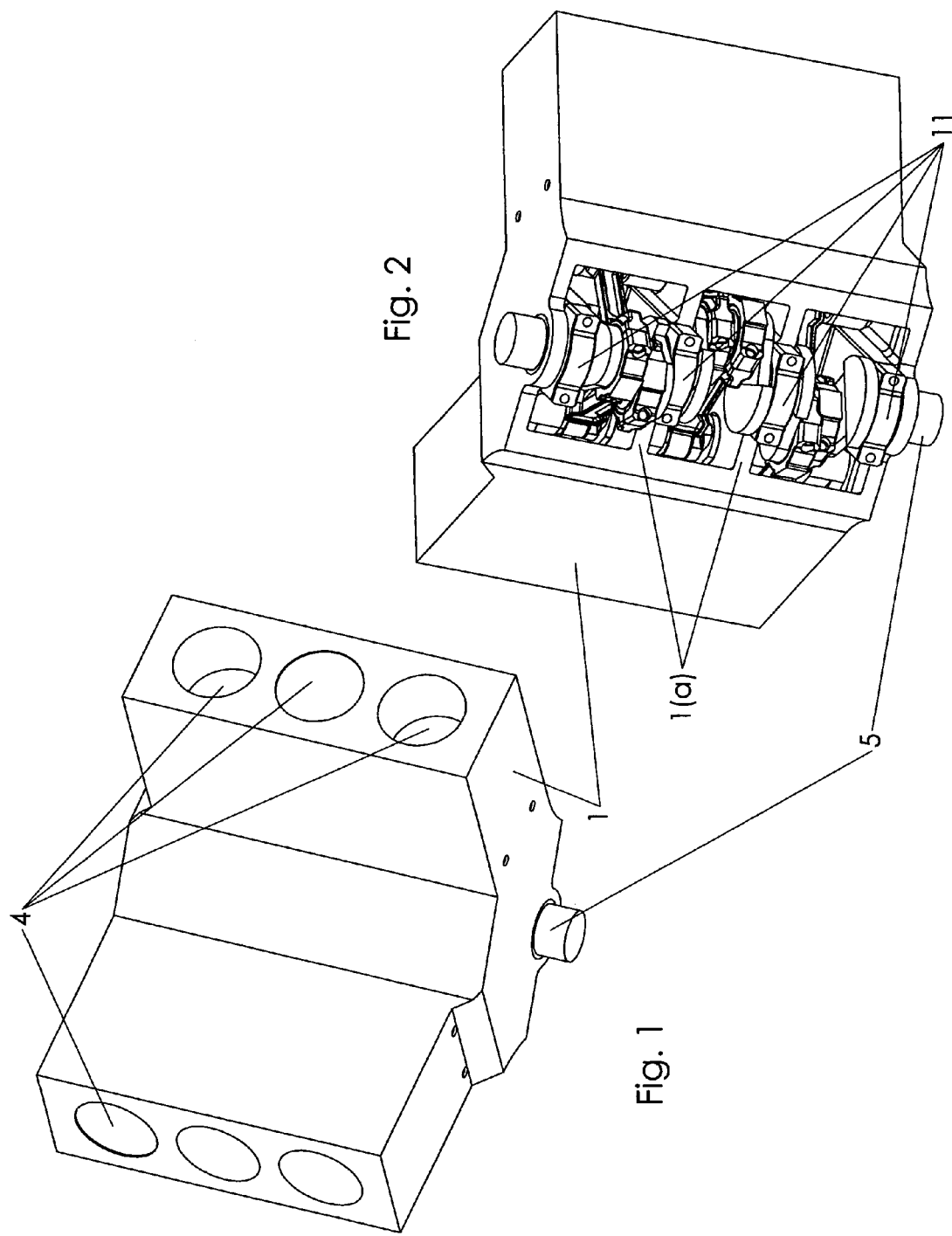

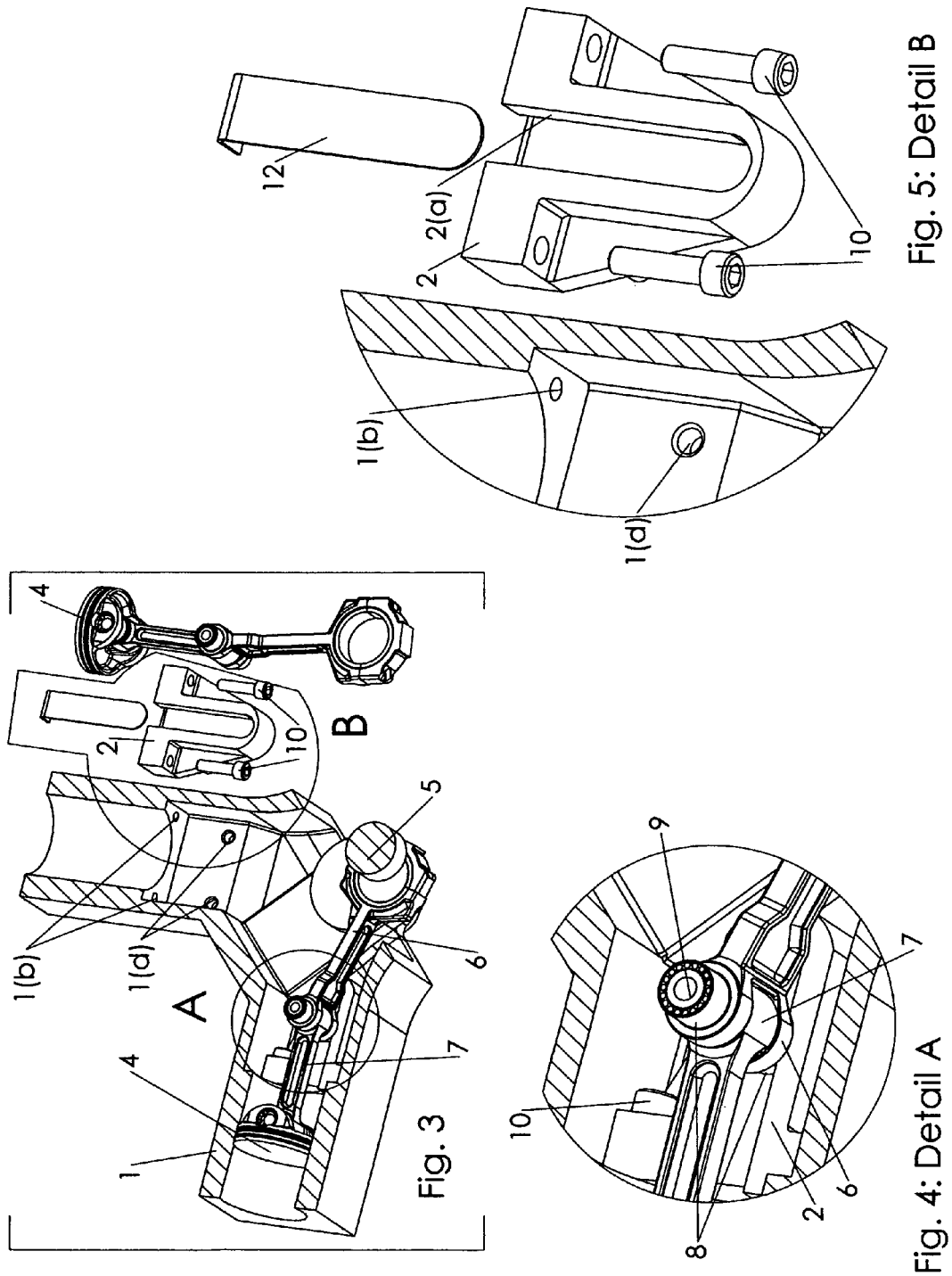

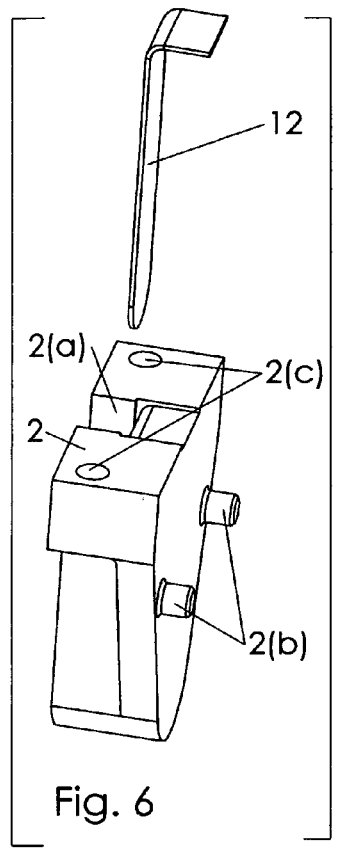
Fig. 6
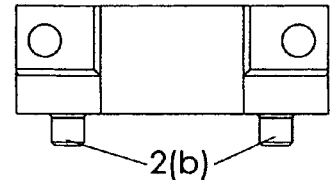
Fig. 9
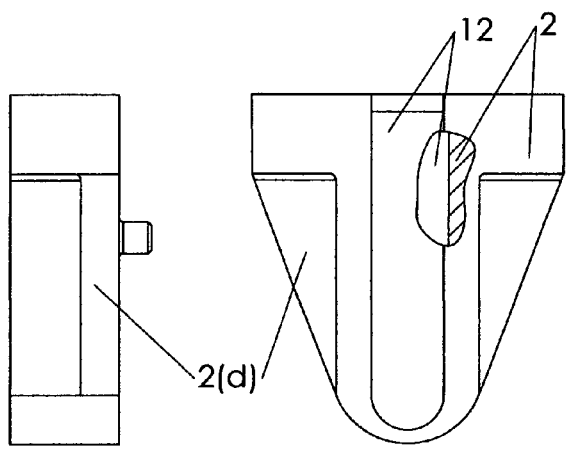
Fig. 8    Fig. 7
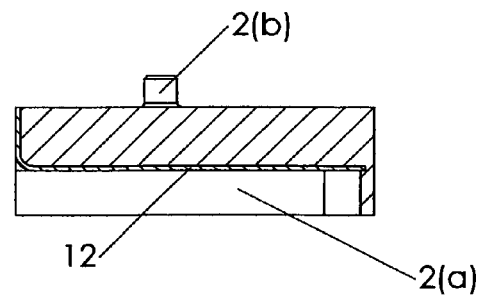
Fig. 11: Section C-C
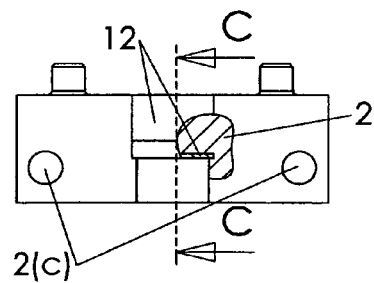
Fig. 10

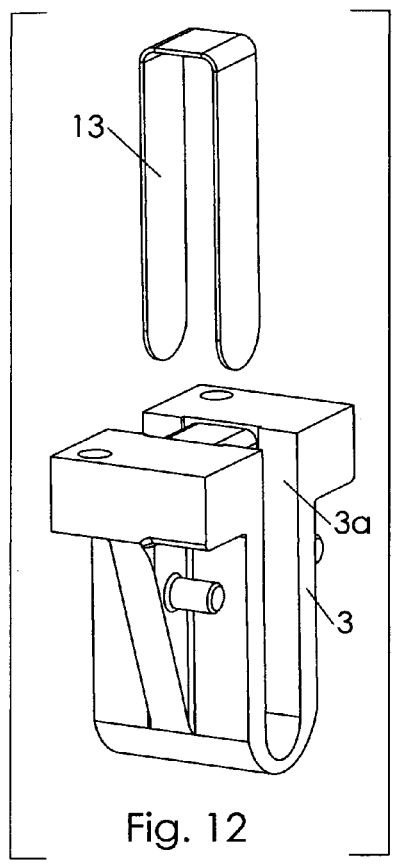
Fig. 12
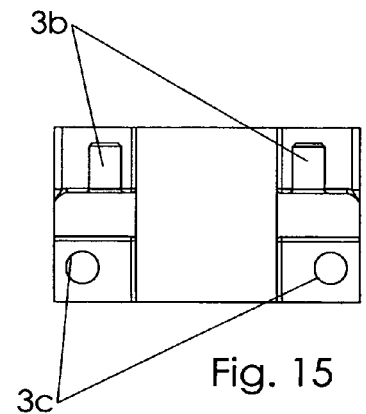
Fig. 15
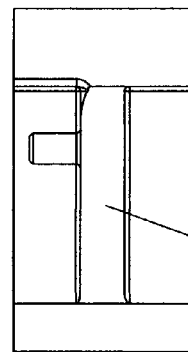
Fig. 14
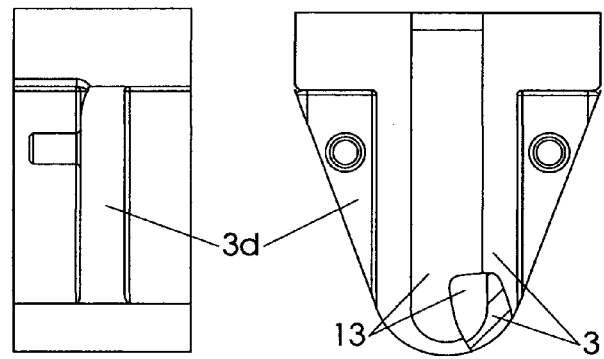
Fig. 13
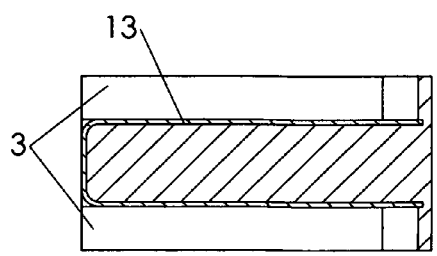
Fig. 17: Section D-D
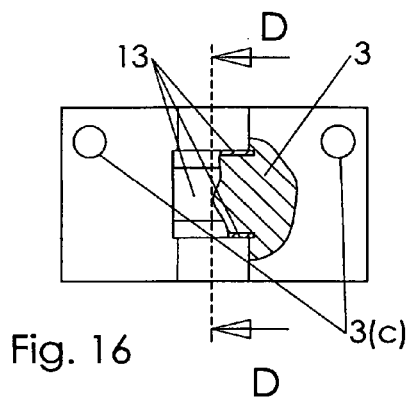
Fig. 16

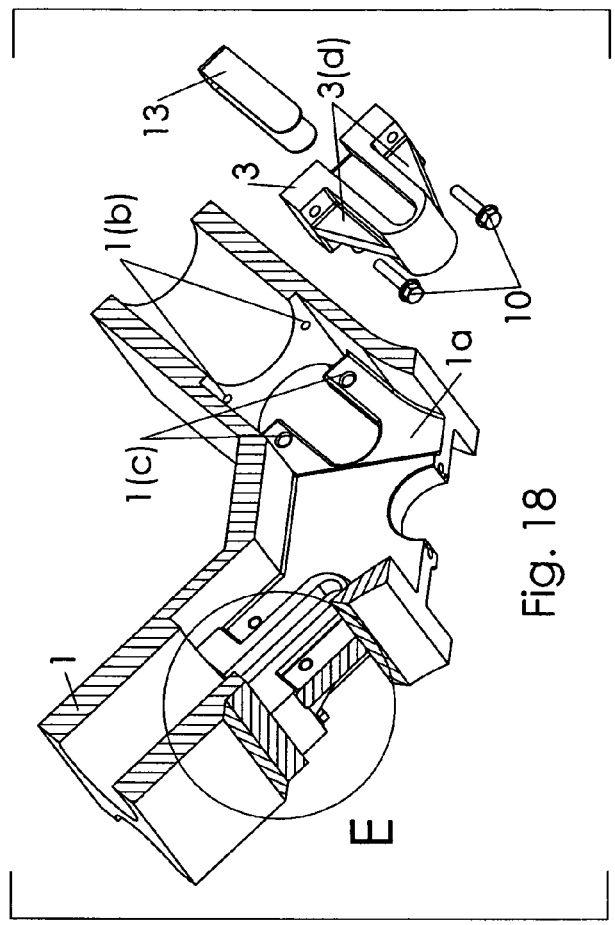
Fig. 18
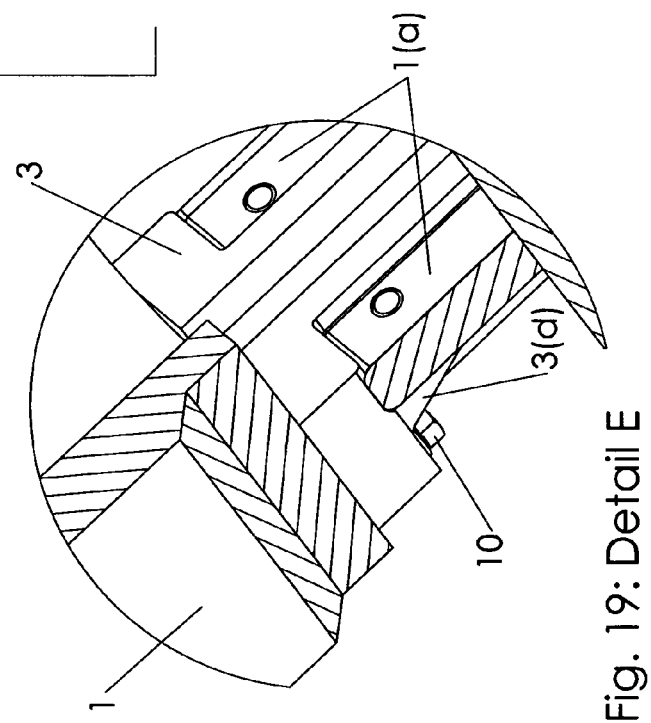
Fig. 19: Detail E

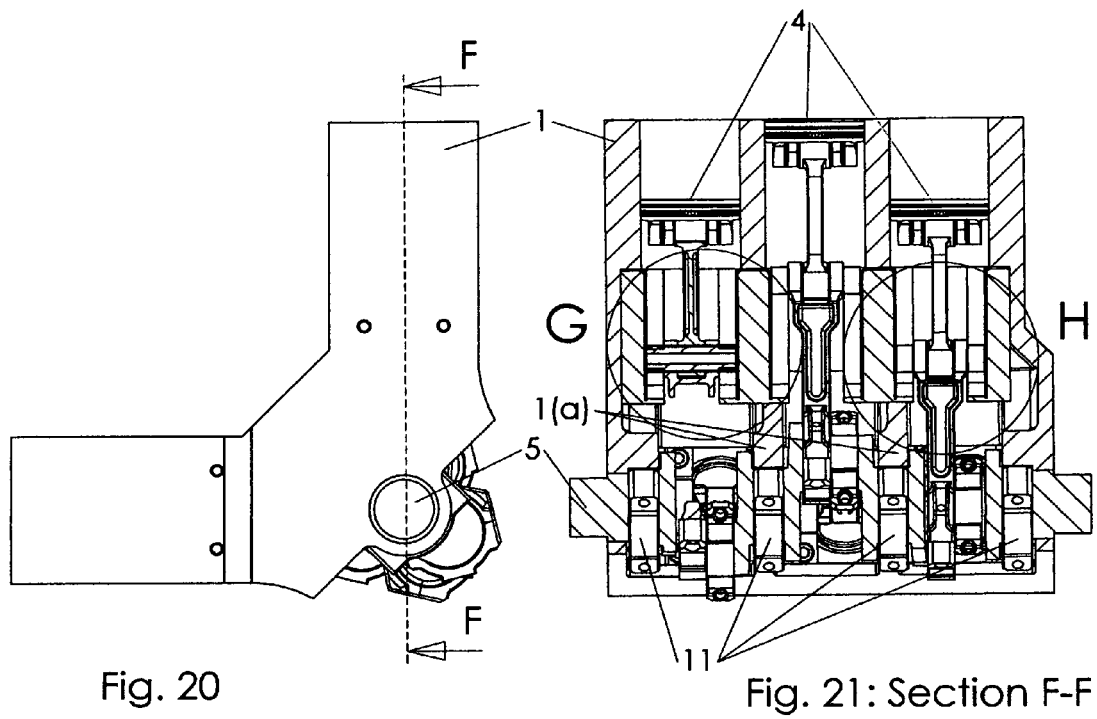
Fig. 20    Fig. 21: Section F-F
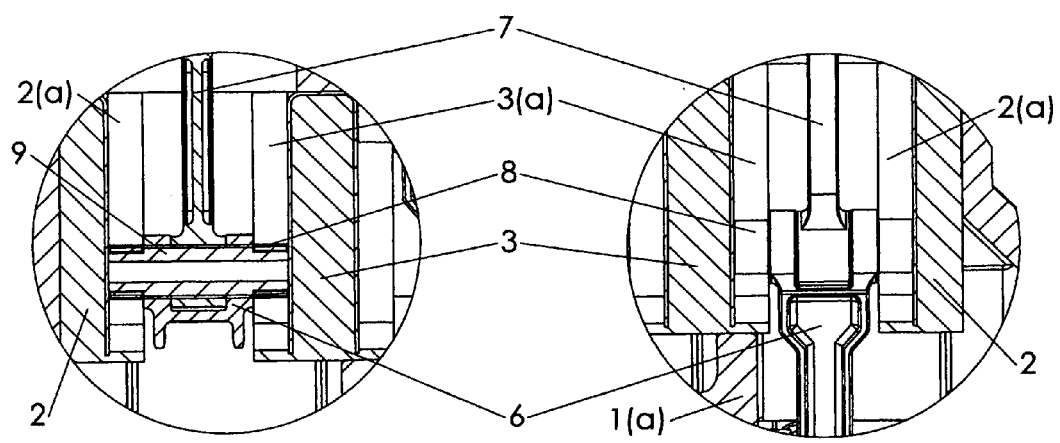
Fig. 22: Detail G    Fig. 23: Detail H

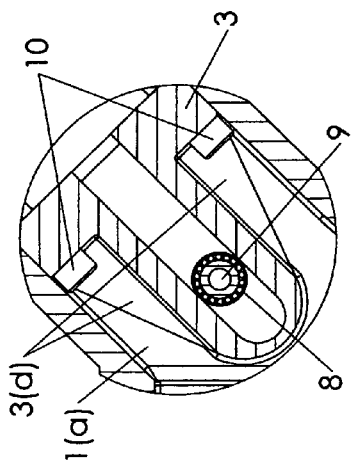
Fig. 26: Detail K
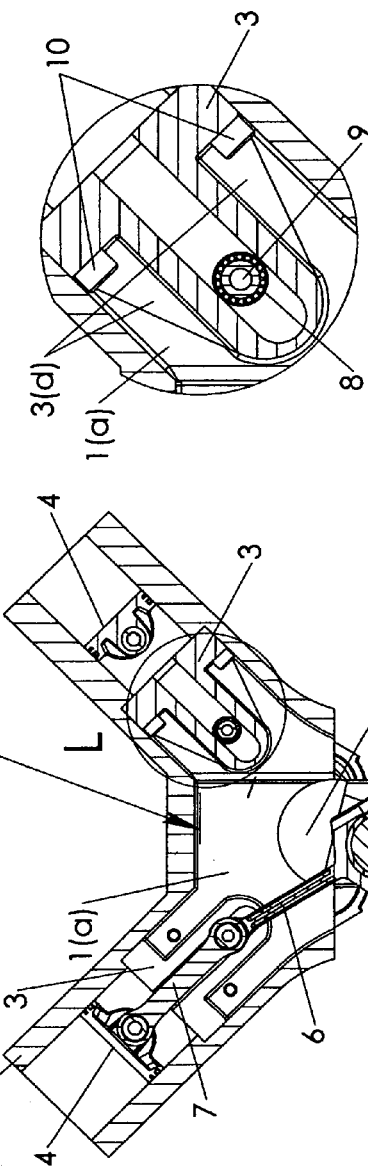
Fig. 27: Detail L
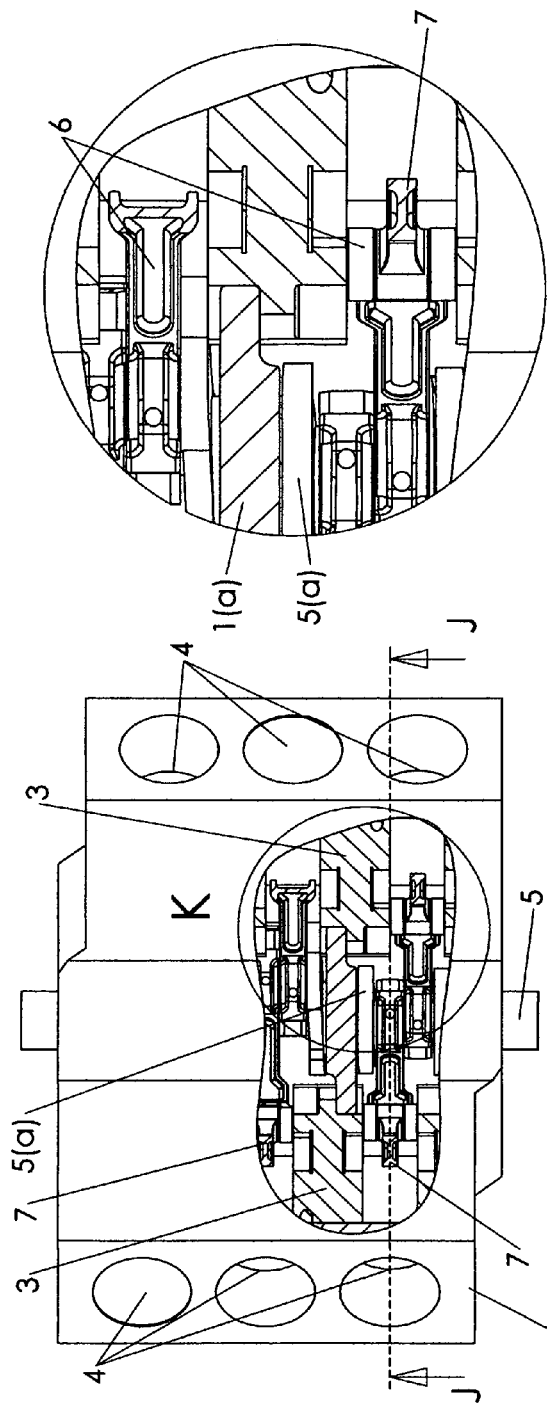
Fig. 24
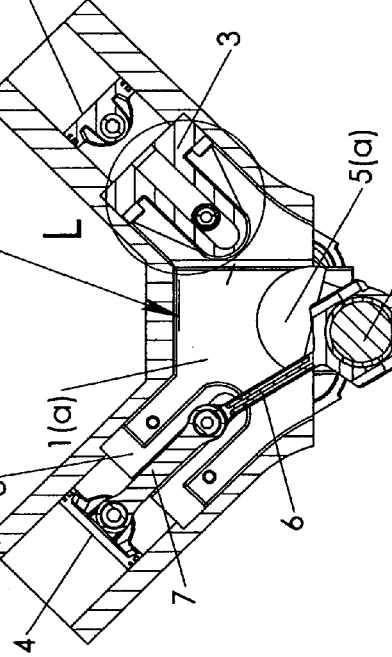
Fig. 25: Section J-J

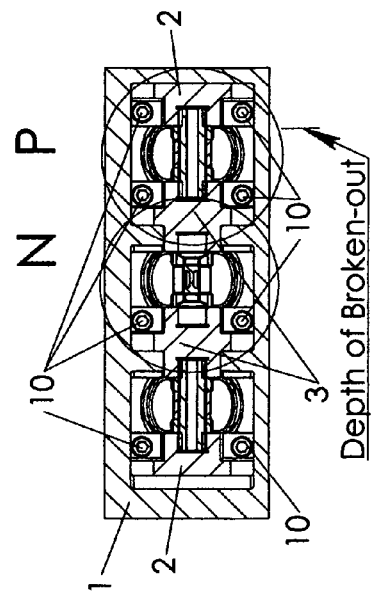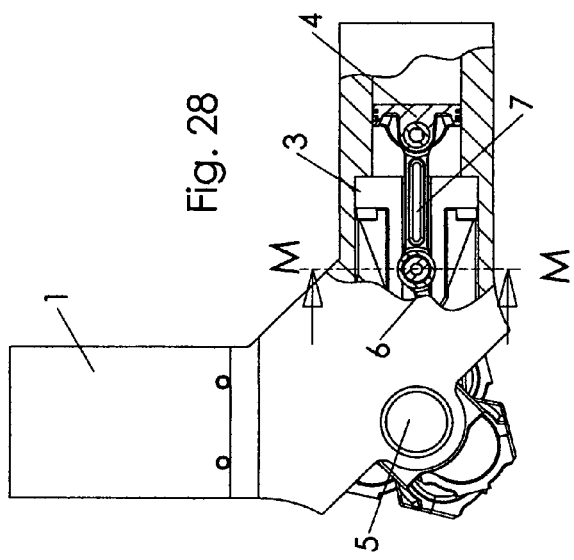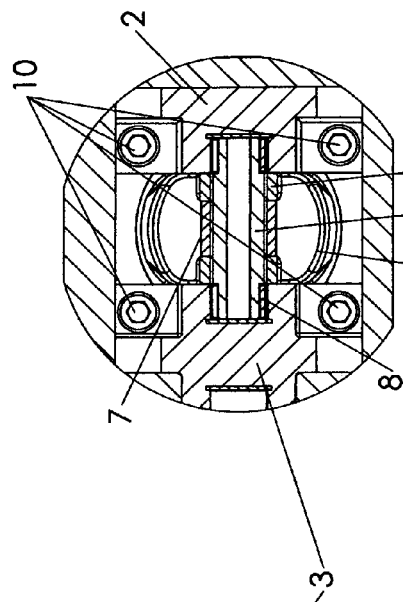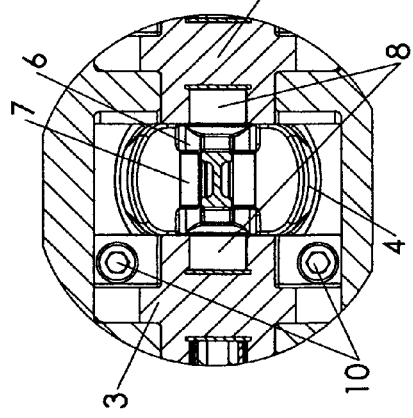
Fig. 28
Fig. 29: Section M-M
Fig. 30: Detail N
Fig. 31: Detail P

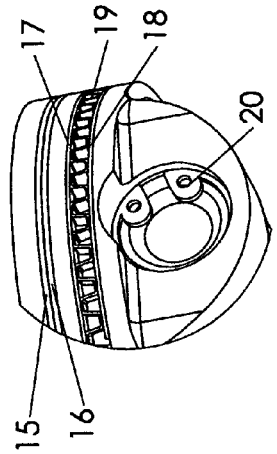
Fig. 32
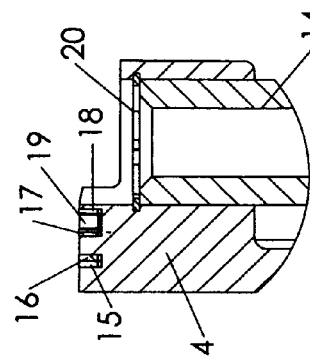
Fig. 36: Detail S
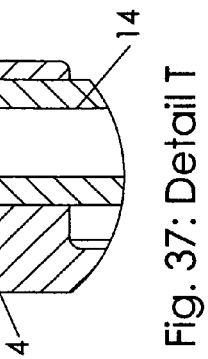
Fig. 37: Detail T
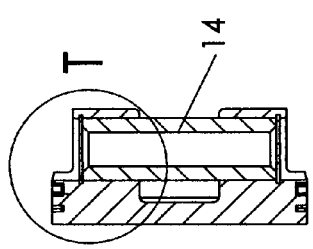
Fig. 34: Section Q-Q
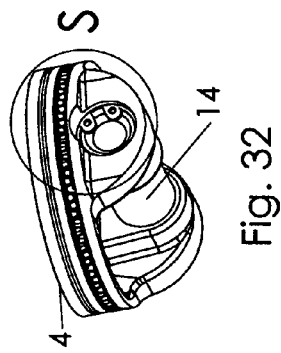
Fig. 33
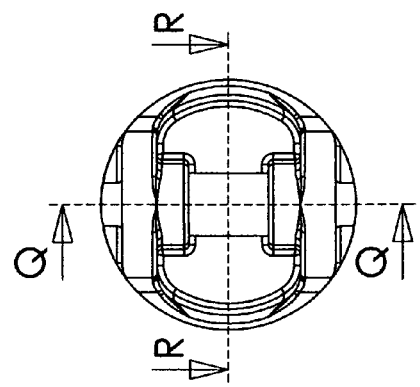
Fig. 35: Section R-R

INTERNAL-COMBUSTION ENGINE

In an Internal-combustion engine, it is known to have a piston, moving inside a cylinder that sets in motion a crankshaft with the aid of a connecting rod. In this invention a slider is included below the piston and is connected to the piston by an auxiliary connecting rod (AC-rod). Moving coaxially with the piston, the slider sets in motion the crankshaft with the aid of a connecting rod.

This invention relates to an Internal-combustion engine, both gasoline and diesel ones.

It is common in an Internal-combustion engine for the piston with rings to move down during the power stroke under the influence of pressure of gas. At the same time the piston pushes a connecting rod and thus rotates the crankshaft. Because the connecting rod is connected to the piston and crankshaft by cylindrical hinges, reacting force affects the piston at the angle equal to the angle at which the connecting rod is positioned in the direction of the piston movement while the connecting rod transfers power to the crankshaft. As a result there is a lateral component of reacting force vector. Due to this component the piston is pushed to the wall of the cylinder that causes additional frictional force that in its turn causes power losses. Besides, it hastens the wear-out of the cylinder-piston pair. These shortcomings are especially showing at high working loads.

The objective of this invention is elimination of these disadvantages and as a result increasing the economy and service life of an engine.

The above-said objective is accomplished by the fact that this engine having all the elements of a configuration of an ordinary engine has also a slider which is connected to the piston by means of an auxiliary connecting rod (hereinafter referred to as "AC-rod") similar by its design to an ordinary connecting rod.

A slider is a hollow cylindrical pin with needle bearings on both ends. In the middle island the slider is connected by hinges to the lower end of AC-rod and the upper end of the connecting rod. When a piston travels up-and-down a slider also travels up-and-down and needle bearings on its both ends easily roll in the square shoots of guides which are fastened rigidly under the lower edge of the cylinder. A slider, in its turn, sets the crankshaft in a rotating motion with the aid of a connecting rod. Thus, in the suggested Engine the lateral component of the force is taken up by a slider which during the motion in the guide's square shoots undergoes resistance to rolling.

Embodiments of the invention are illustrated in drawings where engine V6 is taken as an example (hereinafter referred to as "Engine").

FIGS. 1 and 2 illustrate general views of the Engine without a cylinder head and an oil pan—from top and from bottom correspondingly.

In FIG. 3 there is a cut fragment of Engine that illustrates the operating principal of Engine.

FIGS. 4 and 5 are detail views of the said FIG. 3.

FIG. 6 is a general view of the guide.

FIG. 7 is the front view,

FIG. 8 is the right view,

FIG. 9 is the bottom view, and

FIG. 10 is the top view of the guide.

FIG. 11 is the section view of FIG. 10.

FIG. 12 is a general view of the duplex guide.

FIG. 13 is the front view,

FIG. 14 is the right view,

FIG. 15 is the bottom view and

FIG. 16 is the top view of the duplex guide.

FIG. 17 is the section view of FIG. 16.

In FIG. 18 there is a cut fragment of Engine that illustrates the method of fastening of duplex guides. Fastening method of guides is similar.

FIG. 19 is a detail view of FIG. 18.

FIG. 20 is the front view of Engine turned counterclockwise by 45°.

FIG. 21 is the section view and

FIGS. 22 and 23 are detail views of FIG. 20.

FIG. 24 is the top view of Engine.

FIG. 25 is the section view and

FIGS. 26 and 27 are detail views of FIG. 24.

FIG. 28 is another front view of Engine, but turned clockwise by 45°.

FIG. 29 is the section view and

FIGS. 30 and 31 are detail views of FIG. 28.

In FIGS. 32-37 the piston in relieved version is illustrated. FIG. 32 is a general view of the piston and FIG. 36 is a detail view of FIG. 32. FIG. 33 is the bottom view of the piston with its section views in FIGS. 34 and 35. FIG. 37 is the detail view of FIG. 34.

Figure 38:
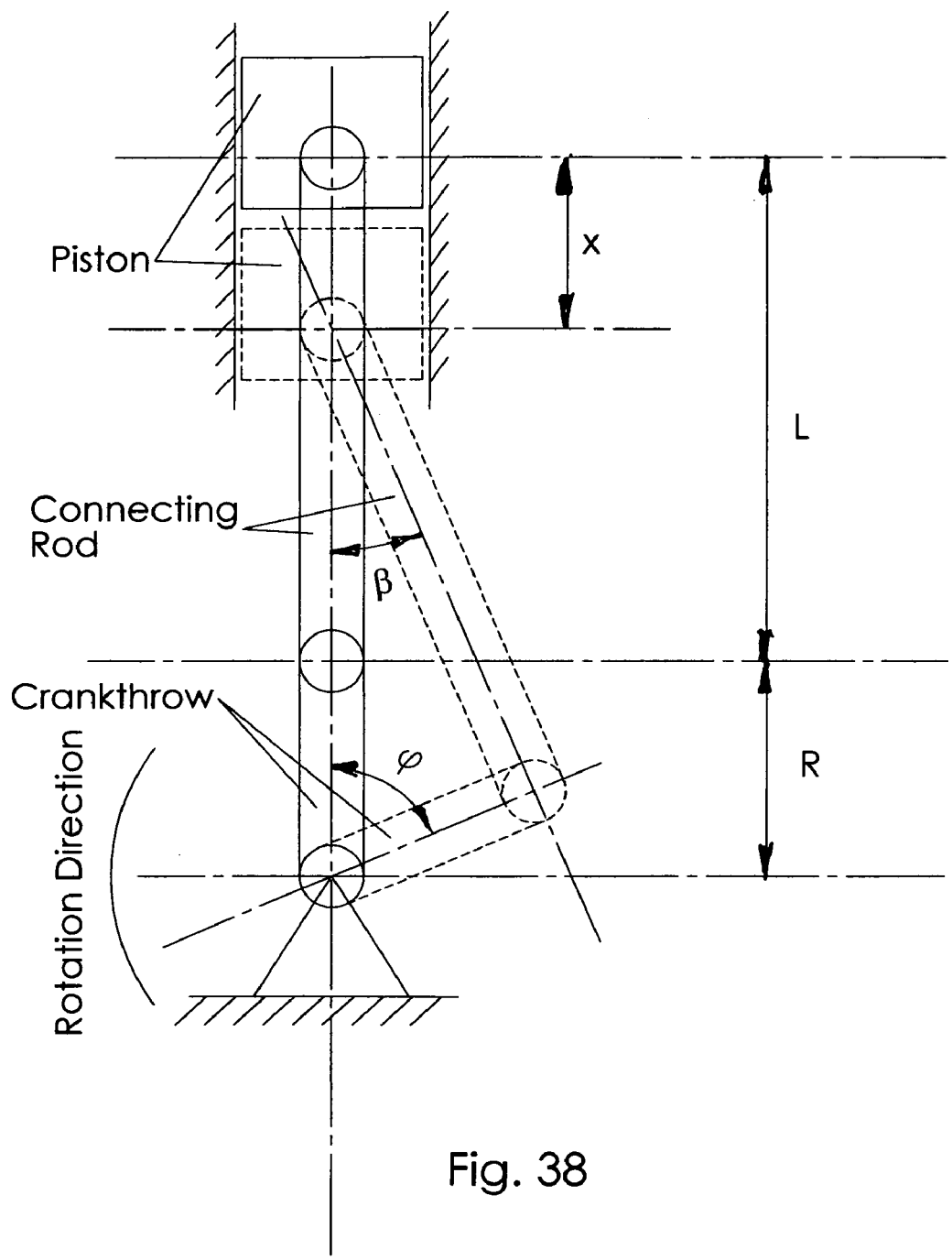
Figure 39:
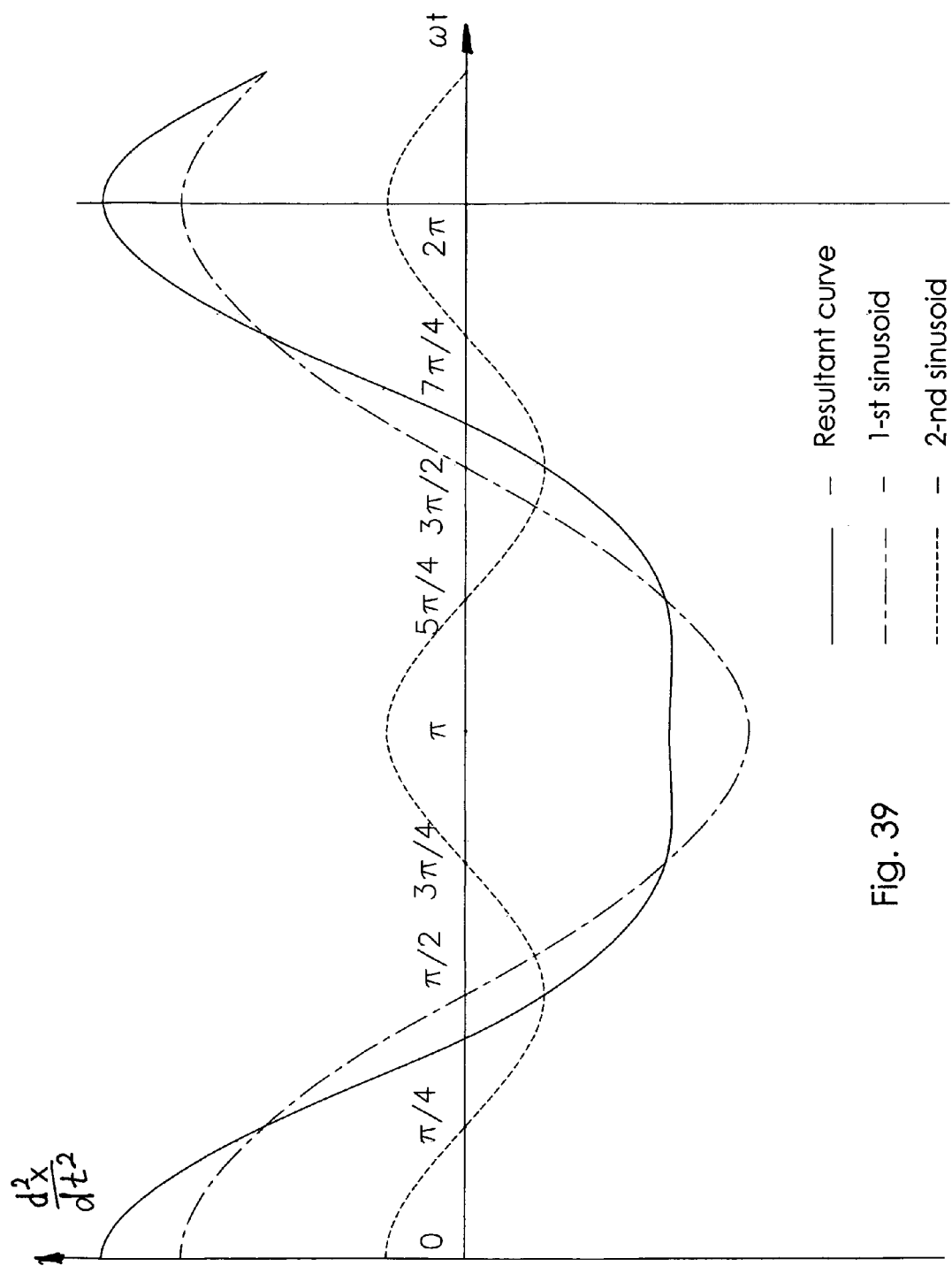

In FIG. 38 kinematic diagram of the crank mechanism of Engine is given to illustrate the dynamic force analysis that is done in the appendix. As a result of this analysis FIG. 39 shows acceleration of the piston as functional connection to the turning angle of the crankshaft.

In FIGS. 1 and 2, Sheet 1, a general view of Engine without a cylinder head and oil pan is shown: top view and bottom view. Here and in the following Figures: 1—cylinder block, 1(*a*)—cross walls of cylinder block, 4—pistons, 5—crankshaft, 11—covers of the main bearings of the crankshaft. In this case pistons of the 2-nd and 4-th cylinders cannot be seen, and those of the 3-rd and 6-th cylinders are in TDC (top dead centre).

In Sheet 2 FIG. 3 is a fragment of Engine, cut off by a transversal plane going through two end cylinders—6-th on the left, and 5-th on the right, is shown. In this figure the 5-th cylinder is pictured as Exploded View. FIG. 4 and FIG. 5 are detailed views of a slider and guide respectively. Here AC-rod 7 is connected pivotally by its upper end with a piston pin, and by the lower end with slider 9.

Let us consider the work of Engine using cylinder 6 as an example (on the left). Piston 4 with the aid of AC-rod 7 sets into motion slider 9 which has two needle bearings at its ends and these bearings roll easily along the side square shoot planes of the guides. One of the guides is guide 2. The other end of the slider abuts and rolls on the square shoot of the duplex guide. This duplex guide is installed in the middle part of the cylinder block and is absent on this fragment of Engine. In view of the fact that a slider takes up the lateral component of the force the needle bearing during this stroke is pressed against one of two parallel opposite side planes 2(*a*) of the guide's square shoot. At the same time the other plane does not abut with the needle bearing. When in the next stroke the lateral component of the force changes its direction into the opposite one, the needle bearing is pressed against the other plane. Thus, during each stroke a clearance between a needle bearing and side planes of the guide is taken up. This clearance corresponds to the running fit (or easy fit). This clearance is sufficient for the needle bearing to abut and slide on one of the planes without touching the other one. At the same time such clearance practically doesn't involve lateral displacement of a slider and, consequently, doesn't create lateral loads on the piston. To decrease friction between the butt end of the slider and the frontal plane of the guide's square shoot a bronze L-plate is inserted into the square shoot.

Guide 2 is shown in detail in Sheet 3. FIG. 6 is an exploded general view, FIG. 7 is a front view, FIG. 8 is a view from the right, FIG. 9 is a bottom view, and FIG. 10 is a top view. Here 2(a) is a side plane of the square shoot, 2(b)—positioning dowels on the back plane of the bracing 2(d), 2(c)—bores for screws, 12—L-plate. The guide is fastened to the cylinder block 1 with the aid of 2 positioning dowels 2(b), inserted into bores 1(d), FIG. 5, Sheet 2, in the butt end wall of the cylinder block and two bolts 10, which are screwed into threaded bores 1(b), FIG. 5, Sheet 2.

Duplex guides 3, as different from the guides, have square shoots on both sides of the bracing and are installed in the middle part of the cylinder block. In Sheet 4, FIG. 12 is an exploded general view of duplex guide, FIG. 13 is a front view, FIG. 14 is a view from the right, FIG. 15 is a bottom view, and FIG. 16 is a top view. Here 3(a) is a side plane of the square shoot, 3(b) positioning dowels on the back surface of the bracing 3(d), 3(c)—bores for screws, 13—bronze U-plate which paves the front planes of both square shoots.

In sheet 5, FIG. 18, the method of fastening of duplex guides is embodied on the fragment of cylinder block 1 cut off by transversal planes, one of which goes through 5-th and 6-th cylinders, and the other through 3-rd and 4-th ones. Fastening of duplex guide 3 to the cylinder block 1 is similar to the fastening of guide 2. Positioning dowels 3(b) are inserted in bores 1(c) which are placed on cross walls 1(a), up to abutment on the back surface of bracing in the cross wall. Duplex guide 3 is also fastened by two bolts 10.

In Sheets 6-8 Engine is embodied from different views (without cylinder head and oil pan). Here we have the same denotations of parts as in the previous Figures: 1—cylinder block, 4—pistons, 2—guides, 3—duplex guides, 9—sliders, 8—needle bearings, 7—ACrods, 6—connecting rods, 2(a) and 3(a)—side planes of guide's and duplex guide's square shoots respectively, along which needle bearings 8 roll.

On Sheet 6 FIG. 20 is a front view of Engine turned counterclockwise by 45°. FIG. 21 is a section view F—F. This section passes through longitudinal axes of 1-st, 3-rd and 5-th cylinders and the cylinders, guides 2, duplex guides 3 and crankshaft 5 on overall section and also connecting rod 6, AC-rod 7, slider 9 and needle bearings 8 of the 1-st cylinder are shown cut by the section plane. Other parts are shown without cutting. FIGS. 22 and 23 are detailed views of sliders and needle bearings of the 1-st and 5-th cylinders respectively.

On Sheet 7 FIG. 24 is a top view of the Engine. FIG. 25 is Section J-J that is out of alignment of the 1-st cylinder's centerline so that it cuts slider 9 together with one of two needle bearings 8 and corresponding duplex guide 3. At the same time Section J-J passes through the centerline of the 2-nd cylinder. Here 5(a)—is a crankcase counterweight of the 2-nd crankshaft throw.

On Sheet 8 FIG. 28 is front view of Engine turned clockwise by 45°. FIG. 29 is Section View M-M that cuts Engine through the axis of slider 9 of the 1-st cylinder. Here 10—are bolts, fastening guides 2 and duplex guides 3 to the cylinder block. FIGS. 30 and 31 are detailed views of sliders from below. Meanwhile the slider of the 3-rd cylinder together with the needle bearings are located higher than the section plane.

The advantage of this Engine is the fact that when in use there is no lateral component of the force on the piston which is taken up by the slider rolling by the bearings. As a result of this compression of the piston in the cylinder is improved, power losses on friction are reduced and wear out of the cylinder is decreased.

Also due to the absence of the lateral component of the force on the piston, the latter can be made in a relieved version, e.g. without a skirt and with two compressing rings in one groove. The application of a relieved piston is necessary to compensate additional dynamic forces produced by the presence of AC-rod and a slider which perform progressive motion together with the piston. Such variant of a relieved piston is embodied in Sheet 9, FIGS. 32-37. Here: 14—is a piston pin, 15 and 16 are compression rings, 17 and 18—side rails, 18—spacer/expander, 20—circlet.

Analysis of dynamic forces affecting the parts of the crank mechanism that move progressively (piston+AC-rod+slider) is embodied in appendix 1.

APPENDIX 1

Analysis of Dynamic Force, Effecting Progressively Moving Parts (Piston+AC-Rod+Slider) of the Crank Mechanism of the Internal-Combustion Engine Kinematic diagram of the mechanism is given in Sheet 10, FIG. 38. Here progressively moving parts have been replaced by a piston of equal mass. The mechanism is embodied in two positions: when the piston is in TDC, which we take as an initial position and in the position when the crankshaft throw is turned through the current angle $\phi$.

L—is the length of the connecting rod, R—is the length of the crankshaft throw. The length of a connecting rod or a crankshaft throw implies the distance between the axes of cylindrical hinges on both ends of these parts. Then R+L—is the distance between the fixed axis of the rotation of the crankshaft throw and the axis of the piston pin at the position of the piston in TDC, x—is the current linear coordinate of the piston, corresponding to the turning angle $\phi$.

$$L+R-x=L\cos\beta+R\cos\phi$$

$$x=L-L\cos\beta+R-R\cos\phi$$

$$\sin\beta = \frac{R\sin\varphi}{L}; \beta = \arcsin\left(\frac{R\sin\varphi}{L}\right) \quad (1)$$

$$x = R(1-\cos\varphi) + L\left\{1 - \cos\left[\arcsin\left(\frac{R\sin\varphi}{L}\right)\right]\right\}$$

At the constant rotation speed of the crankshaft, $\phi=\omega \cdot t$ where $\omega$—is angular velocity, t—is time.

Then equation (1) will be written:

$$x = R(1-\cos\omega t) + L\left\{1 - \cos\left[\arcsin\left(\frac{R\sin\omega t}{L}\right)\right]\right\}$$

The speed will be:

$$\frac{dx}{dt} = R\omega\sin\omega t + L\sin\left[\arcsin\left(\frac{R}{L}\sin\omega t\right)\right]\frac{1}{\sqrt{1-\frac{R^2\sin^2\omega t}{L^2}}} \cdot \frac{R}{L}\omega\cos\omega t \quad (2)$$

$$\frac{dx}{dt} = R\omega\sin\omega t + L\omega\frac{R}{L} \cdot \frac{\frac{R}{L}\cos\omega t}{\sqrt{1-\frac{R^2\sin^2\omega t}{L^2}}} \cdot \sin\omega t$$

$$\frac{dx}{dt} = R\omega\sin\omega t + \frac{\omega}{2}\frac{R^2}{L} \cdot \frac{\sin 2\omega t}{\sqrt{1-\frac{R^2\sin^2\omega t}{L^2}}}$$

Differentiation of equation (2) in order to find acceleration leads to a very lengthy expression due to the presence in the right part of equation (2) of a denomination $$\sqrt{1 - \frac{R^2 \sin^2 \omega t}{L^2}}$$

However, taking into consideration that the length of the connecting rod is several times bigger than the length of the crankshaft throw, we can assume that $$\sqrt{1 - \frac{R^2 \sin^2 \omega t}{L^2}} \approx const \approx 1$$

Then:

$$\frac{d^2 x}{dt^2} = R\omega^2 \left( \cos \omega t + \frac{R}{L} \cdot \cos 2\omega t \right) \quad (3)$$

The obtained equation (3) is the sum of two sinusoids. The character of the resultant curve depends on the ratio R/L which is the coefficient at the second sinusoid. The other parameters (R,ω) are common for the whole equation and determine absolute values of coordinates $$\frac{d^2 t}{dt^2}$$

of resultant curve.

FIG. 39, Sheet 11 illustrates functional connection of acceleration of the piston to the turning angle of the crankshaft at the picked out ratio $$\frac{R}{L} \approx 3.6.$$

The curves are built up at an arbitrary scale. As seen from the graph the highest acceleration takes place at passing of the piston through TDC, consequently at that time the parts of the crank mechanism should undergo the highest inertial force. However, in a four-stroke engine, which goes two revolutions per cycle, this statement is true only at the moments when passing of the piston through TDC corresponds to the end of the exhaust stroke and the beginning of the intake stroke. In the subsequent passing of the piston through TDC the piston undergoes the force of compressed gas which not only compensates the inertial force but loads the parts of the crank mechanism with the oppositely directed force.

The embodiments of the invention in which an exclusive property or privilege is claimed are defined as follows:

1. An Internal-combustion engine, the crank mechanism of which comprising:
    a cylinder block, as a fixed part, that consists of cylinder banks and a crankcase;
    pistons with a piston pin, one per cylinder, as an initial segment of the crank mechanism, moving progressively due to thermal energy of combustion of fuel inside the cylinders;
    a crankshaft as a terminal segment of the crank mechanism, rotating in bearings in the crankcase of the cylinder block;
    guides and duplex guides that are rigidly secured to the lower plane of the cylinder banks of the cylinder block and are lined up face to face lengthwise the cylinder bank;
    connecting rods, each one coming with each corresponding piston, with the aid of which the progressive motion is converted to the rotation of the crankshaft;
    sliders, each one coming with each corresponding piston, that are piston-actuated, move in the corresponding guides and duplex guides coaxially with the said pistons, actuate the corresponding connecting rods and are assigned to take lateral force from the said connecting rods;
    auxiliary connecting rods (AC-rods), each one coming with each corresponding piston, to connect the said pistons with the corresponding sliders.

2. The Internal-combustion engine as defined in claim 1, in which the guides have one face and one back surface and are positioned at the ends of the cylinder bank beyond the end cylinders.

3. The Internal-combustion engine as defined in claim 1, in which the duplex guides have two oppositely oriented faces and are positioned between two adjacent cylinders of the cylinder bank.

4. The Internal-combustion engine as defined in claim 1, in which the guides and duplex guides have a square shoot on the faces of the guides and duplex guides and the said square shoot extends along the longitudinal axis of the cylinder.

5. The Internal-combustion engine as defined in claims 1-4, in which the slider is a hollow pin and has needle bearings on its both ends, and the said slider rolls by the said couple of needle bearings in the square shoots of the corresponding guide and- duplex guide pair in the case the said slider corresponds to end cylinder piston, and rolls in the square shoots of the corresponding couple of duplex guides in the case the said slider corresponds to between cylinder piston.

6. The Internal-combustion engine as defined in claim 5, in which the slider taking a lateral force during each stroke abuts and rolls by each of two needle bearings on one of two parallel opposite side planes of the square shoot of the corresponding duplex guide, and guide, without touching the other side plane as there is a clearance between a needle bearing and the said two parallel opposite side planes.

7. The Internal-combustion engine as defined in claim 6, in which the said clearance between the needle bearing and the said two parallel opposite side planes is small enough not to involve lateral displacement of the slider and, consequently, not to create lateral loads on the piston.

8. The Internal-combustion engine as defined in claim 1, in which the AC-rod is pivotally connected to the piston pin and pivotally connected to the slider.

9. The Internal-combustion engine as defined in claim 1, in which the connecting rod is pivotally connected to the slider and pivotally connected to the journal of the crankshaft.

10. The Internal-combustion engine as defined in claim 1, in which due to the absence of the lateral component of the force on the piston, the latter is made in a lightened version without a skirt and with two compressing rings in one groove.

* * * * *